No. 633,185. Patented Sept. 19, 1899.
C. H. ELLINGWOOD.
MACHINE FOR CUTTING AND TENONING STOCK.
(Application filed June 5, 1899.)

(No Model.) 3 Sheets—Sheet 1.

No. 633,185. Patented Sept. 19, 1899.
C. H. ELLINGWOOD.
MACHINE FOR CUTTING AND TENONING STOCK.
(Application filed June 5, 1899.)
(No Model.) 3 Sheets—Sheet 2.

Witnesses:
Carl H. Noe.
Charles B. Nevin.

Inventor,
C. H. Ellingwood.
By R. J. McCarty
Attorney.

No. 633,185. Patented Sept. 19, 1899.
C. H. ELLINGWOOD.
MACHINE FOR CUTTING AND TENONING STOCK.
(Application filed June 5, 1899.)
(No Model.) 3 Sheets—Sheet 3.

UNITED STATES PATENT OFFICE.

CHARLES H. ELLINGWOOD, OF TIDIOUTE, PENNSYLVANIA.

MACHINE FOR CUTTING AND TENONING STOCK.

SPECIFICATION forming part of Letters Patent No. 633,185, dated September 19, 1899.

Application filed June 5, 1899. Serial No. 719,864. (No model.)

*To all whom it may concern:*

Be it known that I, CHARLES H. ELLINGWOOD, a citizen of the United States, residing at Tidioute, in the county of Warren and State of Pennsylvania, have invented certain new and useful Improvements in Machines for Cutting and Tenoning Stock; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a machine to be used in connection with the manufacture of chairs and other articles where small stock is used and where mortise-and-tenon joints are made. The machine comprises means for automatically gripping and holding the stock while the same is moved to a position to be operated on by the saws and chucks to cut the same into desirable lengths and make tenons thereon and to means for releasing said stock after so acted upon by the saws and chucks.

Preceding a detailed description of the invention reference is made to the accompanying drawings, of which—

Figure 1:
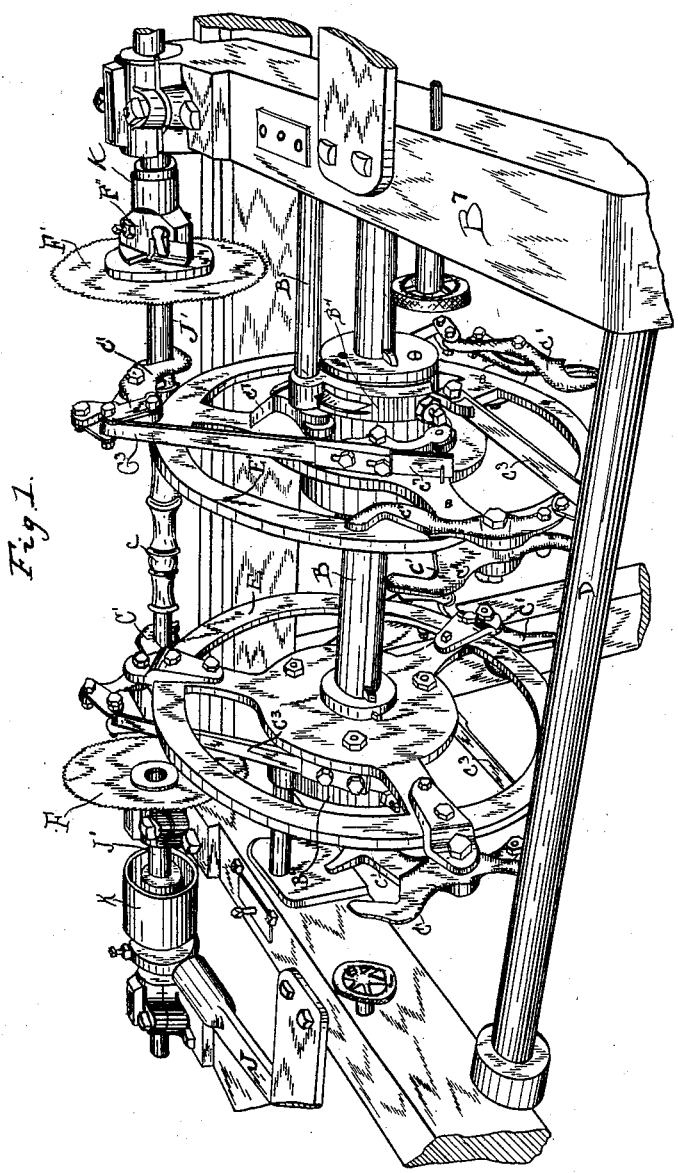
Figure 2:
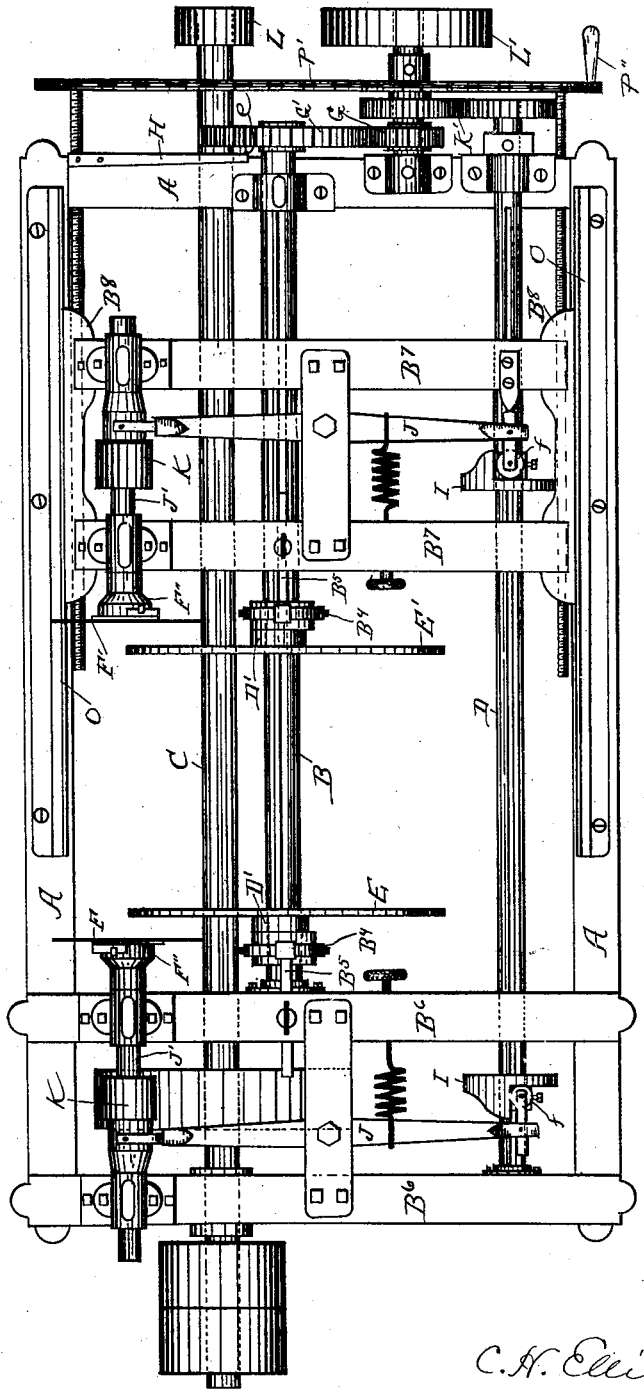
Figure 3:
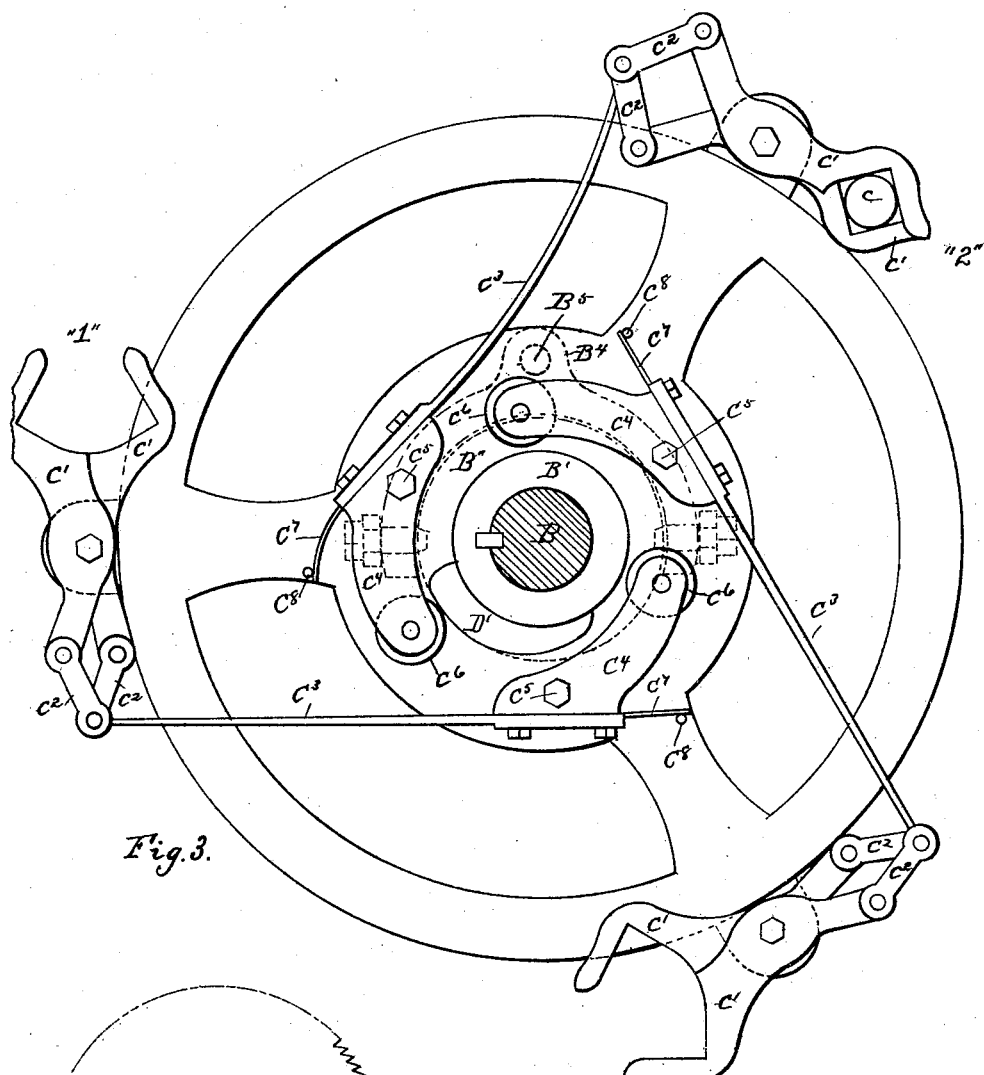
Figure 5:
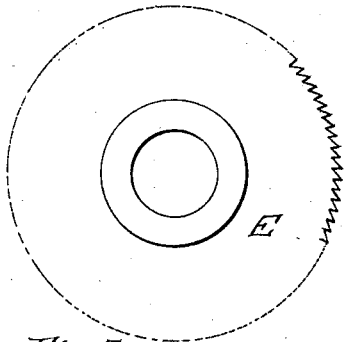
Figure 4:
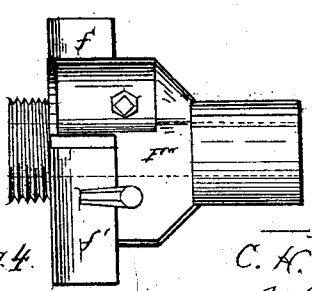

Figure 1 is a perspective view of the main portion of a machine having my invention thereon. Fig. 2 is a top plan view, the stock-grippers being removed from the wheels. Fig. 3 is an enlarged face elevation of one of the gripper-wheels with grippers thereon. Fig. 4 is a detail view of one of the tenon-chucks. Fig. 5 is a detail front view of one of the circular saws.

In a detailed description similar letters and figures of reference indicate coresponding parts in the several views.

A rectangular frame A supports the several journal-bearings for the shafts B, C, and D and other bearings for the various parts of the mechanism.

E and E' designate gripper-wheels that are mounted to turn with shaft B, and provision is made by means of a key-seat in said shaft whereby the wheel E' may be moved along said shaft in a manner and for a purpose which will hereinafter be explained. B'' are collars surrounding hubs B' of said wheels and which are made stationary by means of yokes B$^4$ and brace-bars B$^5$, the latter being attached to the yokes and to the frames B$^6$ and B$^7$. Frame B$^6$ is stationary; but frame B$^7$ is subject to a sliding movement for a purpose which will hereinafter be explained. Stock-grippers, consisting of members C' C', are pivotally mounted at the peripheries of wheels E and E' and have connected to them toggle-levers C$^2$ C$^2$, which are connected with spring-arms C$^3$. The inner ends of these spring-arms are fastened to levers C$^4$, which are pivoted at C$^5$ to the hub of each of the gripper-wheels E E'. Levers C$^4$ have each a roller C$^6$, which is adapted to ride over a stationary cam D'. The said levers also have springs C$^7$ on their inner ends that are engaged by pins C$^8$ on the gripper-wheels and exert outward pressure on the levers C$^4$. The cams D' are a part of the collars. Therefore they are held stationary, Referring to Fig. 3, the grippers are shown to be open during the period in which the levers C$^4$ are free from contact with the cam. As each pair of said grippers reach the horizontal position 1 the said grippers are in a position to receive the stock c, upon which they are closed by a roller riding over said cam. The grippers carry the stock around to, say, point 2, at which time the roller leaves the cam, and said grippers are opened by the pressure of spring C$^7$, and thus allow the stock to drop out at the rear side of the machine after it has been operated upon by the circular saws and chucks. As the grippers are carried around the stock is brought in contact with rotating saws F and F', fixed to the faces of tenon-chucks F'' F'', cutting off the ends of said stock the desired length. When the stock reaches the center of the chucks, it is stopped by the short side of the eccentric or one-half spur-wheel G failing to mesh with the primary spur-wheel G' on shaft B. The stock is momentarily held in such position by a spring H, one end of which is fixed to the frame of the machine, and the other end bears upon a pin or projection e on a side of the spur-wheel G' and holds said wheel tight when it is out of gear with wheel G. During this period in which the stock is so held cams I I on shaft D, rotating against rollers f f on levers J J, throw said levers, together with arbors J' J' and chucks F''' F''', the proper distance to make the length of tenon required. The ends of the stock enter the chucks through openings in the axes of the saws and are forced against parallel cutting-blades $f'$ therein. After this operation of cutting the tenons the chucks and saws return to their former positions and the grippers make one-third of a revolution again. The arbors J' of the saws and chucks are driven from the main driving-shaft C by belts passing over pulleys K K. Power is also transmitted to the primary spur-wheel K' from said shaft C by belts passing over pulleys L L'. The sliding frame $B^7$, with which saw F', tenon-chuck, and gripper-wheel E' are moved, moves in ways O O on the main frame by means of screws P P, which engage with threads in the end pieces $B^8$ of said sliding frame. The said screws are turned by chain P' to shift the saw and gripper-wheel to positions to cut different lengths of stock. The chain P' is rotated by means of hand-piece P'', attached to one of the chain-wheels. It is necessary to maintain the saws and gripper-wheel in the same relative positions at all times. Consequently they are both moved to the same extent by the moving frame $B^7$.

Having described my invention, I claim—

1. In a machine of the character described, the combination with rotary gripper-wheels, of grippers mounted thereon, the said grippers each consisting of two movable members, a resilient arm connected with each of said grippers, levers pivotally connected to said wheels and to which the resilient arms are connected, and stationary cams adjacent to said levers whereby said levers are actuated to open and close the grippers through said resilient arms, substantially as and for the purposes specified.

2. In a machine of the character described, the combination of gripper-wheels, stationary cams, stock-grippers mounted on said wheels, toggle-levers connected to said grippers, arms connected to said toggle-levers and pivotally connected to the gripper-wheels, the inner ends of said arms being in the path of the cams, whereby the stock-grippers are alternately opened and closed to hold and release stock.

3. In a machine, of the character described, the combination with revolving stock-grippers, means for opening and closing said grippers at certain points of their revolution, circular saws to cut the ends of said stock when moved thereagainst by the revolving grippers, chucks upon which said saws are mounted, cutting-knives in said chucks for cutting tenons on the ends of said stock after the latter has been cut by the saws, and mechanisms for moving said chucks inwardly to receive the ends of the stock.

4. In a machine of the character described, the combination with a series of revolving stock-grippers, means for opening and closing said grippers at certain points of their revolution, circular saws to cut the ends of said stock, chucks to which said saws are attached, the said chucks having cutting-blades for cutting tenons on the ends of the stock after said stock is operated upon by the saws, and means for moving the chucks inwardly to cut the tenons.

5. In a machine of the character described, the combination with gripper-wheels, of grippers mounted thereon each consisting of two movable members, resilient arms connected to said grippers, levers pivoted to said wheels and to which the resilient arms are connected, a stationary cam in the path of said levers whereby the grippers are opened, and permitted to close at stated periods, circular saws for cutting the ends of stock held by said grippers, tenon-chucks upon which said saws are mounted, means for arresting the movement of the gripper-wheels when the grippers bring the stock to a position in line between said chucks, and mechanism for moving said chucks to engage the ends of the stock when in such position, substantially as specified.

In testimony whereof I affix my signature in presence of two witnesses.

CHAS. H. ELLINGWOOD.

Witnesses:
D. S. THOMPSON,
A. GIBB.